United States Patent [19]
Royse

[11] Patent Number: 4,457,109
[45] Date of Patent: Jul. 3, 1984

[54] FLUSH GLASS WINDOW ASSEMBLY FOR AUTOMOTIVE VEHICLE

[75] Inventor: Marion A. Royse, Fairport, N.Y.

[73] Assignee: Schlegel Corporation, Rochester, N.Y.

[21] Appl. No.: 352,879

[22] Filed: Feb. 26, 1982

[51] Int. Cl.³ ............................................. E05F 11/38
[52] U.S. Cl. ...................................... 49/374; 49/209; 49/348
[58] Field of Search ................. 49/209, 225, 227, 374, 49/348

[56] References Cited

U.S. PATENT DOCUMENTS 4,240,227 12/1980 Hasler et al. ......................... 49/374

FOREIGN PATENT DOCUMENTS 1060286 6/1959 Fed. Rep. of Germany .
2027241 11/1971 Fed. Rep. of Germany .
2435766 2/1976 Fed. Rep. of Germany ........ 49/227

*Primary Examiner*—Kenneth Downey
*Attorney, Agent, or Firm*—Cushman, Darby & Cushman

[57] ABSTRACT

A flush glass window assembly for an automotive vehicle body includes: a window frame formed by the vehicle body and defining a window opening, the frame having side and top seals; a vertically movable window glass adapted to be raised and lowered in the window opening; a guide arrangement for the window glass which guides the glass during vertical movement thereof such that along essentially its entire path of movement the inner surface of each side edge of the glass is spaced outwardly from the respective side seals and such that as the glass approaches its full raised position it moves inwardly toward the interior of the vehicle into contact with the respective seals.

4 Claims, 7 Drawing Figures

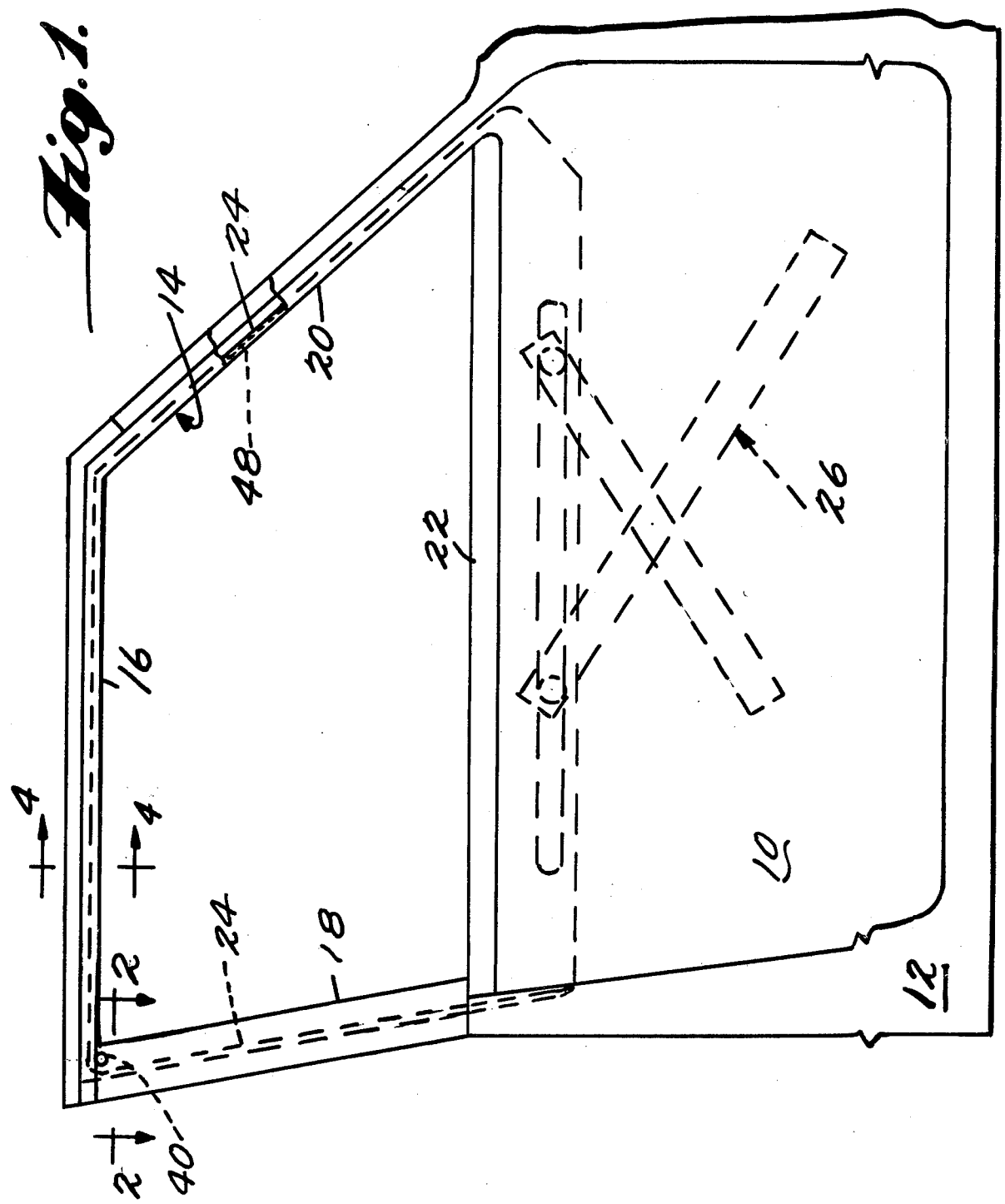

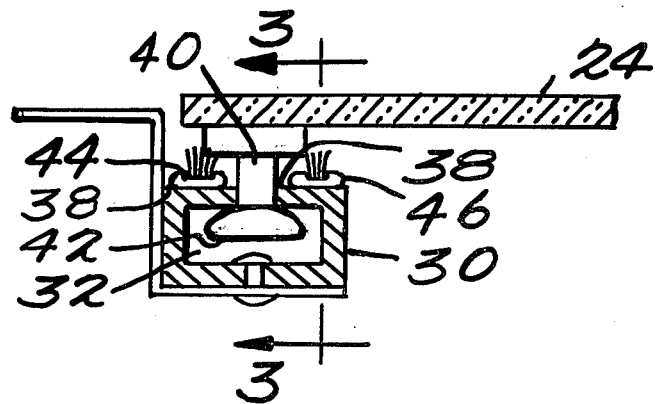
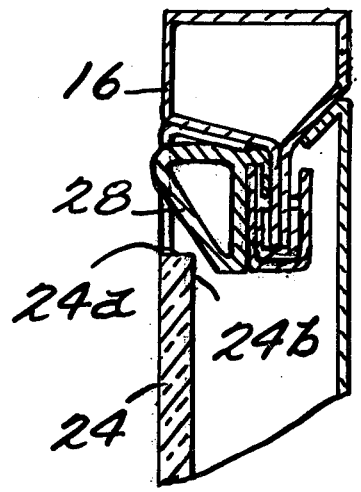
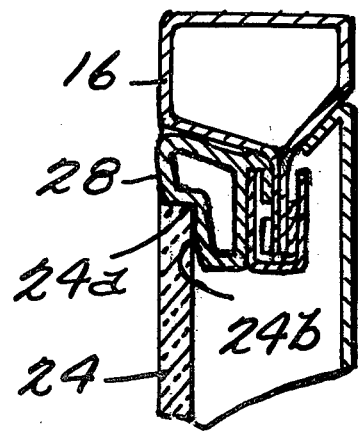

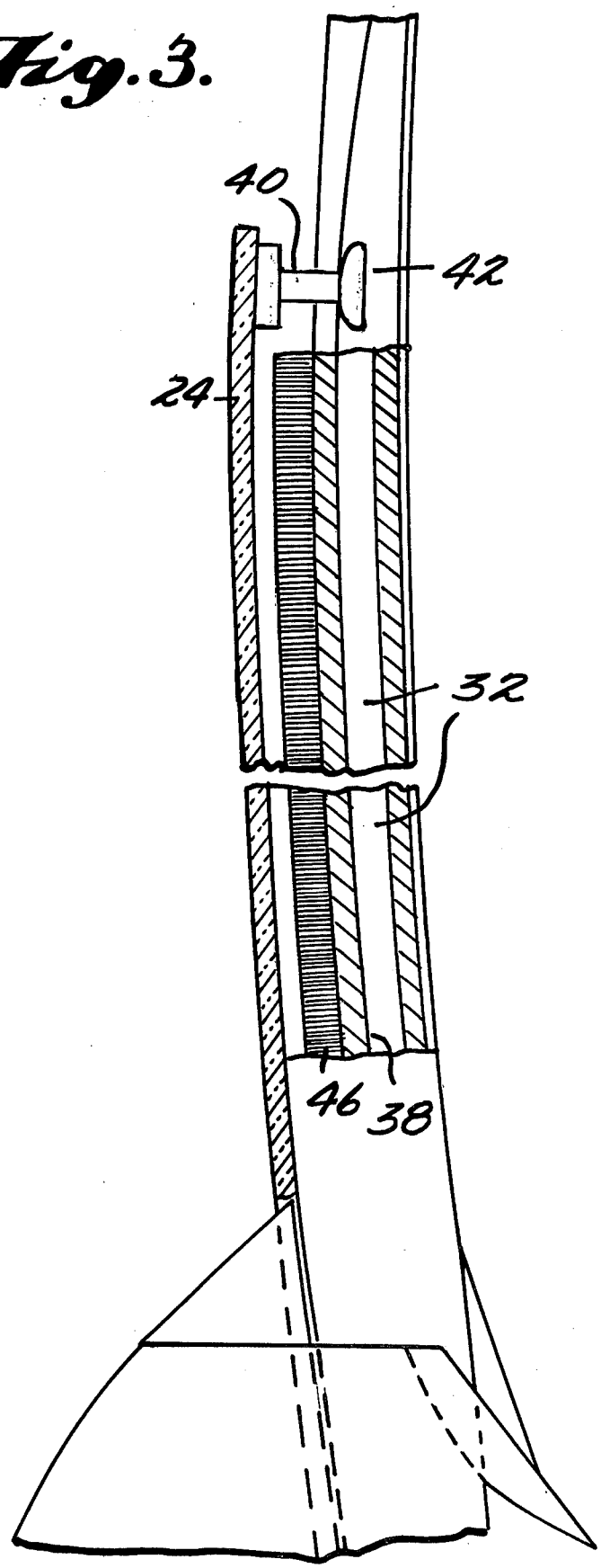

FLUSH GLASS WINDOW ASSEMBLY FOR AUTOMOTIVE VEHICLE

This invention relates to automotive vehicle flush-glass window assemblies in which the glass is vertically adjustable, and in particular it relates to an arrangement for sealing the side and top edges of the glass against sealing strips carried by adjacent portions of the vehicle body.

BACKGROUND AND SUMMARY OF THE INVENTION

There is currently a trend by passenger vehicle body manufacturers to design window assemblies so that in the up or closed position of the glass, all or a substantial portion of the glass above the belt line, especially the upper edge portion, is flush or essentially flush with the outer surface of the vehicle. The main purpose of this so-called flush-glass arrangement is to reduce frictional wind drag during operation of the vehicle, it having been found that the more conventional recessed position of the glass relative to the exterior of the vehicle produces substantial wind drag and consequent wind noise and absorption of energy. A fuller discussion of the advantages of a flush-glass arrangement in passenger vehicles and examples of such assemblies can be found in, for example, U.S. Pat. No. 4,240,227.

A flush-glass arrangement inherently raises the question of how to achieve an efficient seal between the vehicle body and the top and side edges of the glass in the closed position, because the requirement of a flush arrangement inherently excludes the use of fixed side channels directly engaging the glass. Window assemblies of the kind described in the above-identified patent employ fixed polymeric sealing strips which are carried by the frame forming the window opening. The side edges of the glass (i.e. the edges facing in the plane of the glass) and the adjacent inner surfaces of the glass are in full-time sealing contact with their respective sealing strips, while the adjacent outer surfaces of the glass are free of contact with the strips in order to achieve the flush arrangement. In such an assembly it is necessary, in order to form a tight seal, to have the glass in tight engagement with the sealing strips. As a result the seal is a sliding seal during movement of the glass with consequent wear on the seal during vertical movement of the glass. In addition, there is substantial friction, and hence substantial resistance to movement of the glass, especially as the glass approaches its full closed position, because of the large area of contact between the glass and the sealing strips.

The principal object of the present invention is to provide a flush-glass window assembly for automobile vehicles in which a sliding seal is avoided during vertical movement of the window glass and in which a tight compression seal is effected at the end of the closing movement of the glass by movement of the glass toward and into sealing contact with the sealing strips. This arrangement has several advantages. First, the absence of any significant frictional contact between the side edges of the glass and the respective sealing strips during vertical movement of the glass reduces the effort required to move the glass. Second, a compression seal is recognized in the sealing art as a more efficient seal than a sliding seal and hence the use of a compression seal for the glass is preferable to a sliding seal. Third, use of a compression seal rather than a sliding seal avoids abrasive or frictional wear on the sealing strip.

In the preferred construction according to the present invention movement of the glass into compression with the sealing strips is effected by cooperation between at least one fixed guide track spaced from and extending generally parallel to one of the vertical side edges of the glass and a guide member such as a pin or roller projecting from and secured directly to the glass near its upper edge and riding in the track. The upper end portion of the track angles inwardly toward the interior of the vehicle with the result that the guide member and hence the upper edge portion of the glass move inwardly as the glass approaches its full up position. Fixed sealing strips to be engaged by the side and upper edges of the glass are carried by the window frame of the vehicle body. The side sealing strips face outwardly and are located relative to the glass such that there is little or no contact between them and the glass except when the glass moves inwardly as it approaches its full up position. Thus there is no frictional resistance to vertical movement of the glass and no frictional wear on the side strip, yet an efficient compression seal is formed with the glass moves inwardly when arriving at its up position. The sealing strip for the upper edge of the glass also includes an outwardly facing sealing surface which forms a compression seal when the glass moves inwardly.

The above-described movement of the glass is actually a tilting movement about the lower edge portion of the glass. Tilting will normally be accommodated by slight bending of the components of the raising and lowering mechanism and/or bending of the connection between the mechanism and the lower edge of the glass and/or by flexing of the beltline strip to allow movement of the glass. The scope of the present invention extends, however, to arrangements in which the entire glass moves horizontally inward, with little or no tilting or bending. This can be accomplished by providing a second, lower guide track, analogous to the track described above, for guiding the lower edge portion of the glass. In either case no specially designed raising and lowering mechanism is required.

Inward tilting and/or inward horizontal movement of automotive window glass as the glass approaches its full up position is not new per se. German Auslegeschrift No. 1060286 discloses an automotive window assembly of the recessed-glass type having a window glass which is tilted inwardly as it approaches its full up position in order to counteract the exterior vacuum during operation of the vehicle. The tilting movement is effected by guide rails disposed within the body of the door in which the window is mounted, the guide rails forming part of the raising and lowering mechanism. German Auslegeschrift No. 2027241 discloses another automotive window assembly of the recessed-pane type in which a frameless glass pane is tilted inwardly during the last portion of its upward movement. By frameless is meant that there is no frame attached to and movable with the glass. The assembly has special utility in vehicles driven at high speed wherein there is a strong tendency for the glass to be pushed outwardly at high car speed due to excessive pressure build-up inside the car.

German Offenlegungsschrift No. 2435766 discloses an automotive window assembly in which the glass pane is moved outwardly as it reaches its full up position in order to become flush with the exterior of the vehicle body.

The use of a guide track and a guide member attached directly to the glass in an automotive flush-glass window assembly is known. An example of such an assembly appears in the aforesaid U.S. Pat. No. 4,240,227.

U.S. Pat. Nos. 2,317,312 and 3,538,642 disclose horizontally slidable household window sash assemblies having guide channels which cause the movable sash to move outwardly at the end of a closing movement so as to bring the sash into compression against the weatherstrip.

U.S. Pat. No. 3,423,876 discloses an automobile window assembly in which the glass moves upwardly and outwardly in order to "open" the window and moves downwardly and inwardly to a closed position.

BRIEF DESCRIPTION OF THE DRAWINGS

FIG. 1 is a schematic elevational view of an automobile door fitted with a window assembly embodying the principles of the present invention;

FIG. 2 is a fragmentary sectional view taken on the line 2—2 of FIG. 1, modified to the extent that the window glass is shown in the partially raised position;

FIG. 3 is a sectional view taken on the line 3—3 of FIG. 2, showing the window glass in a partially raised position;

FIG. 4A is a sectional view taken on the line 4A—4A of FIG. 1;

FIG. 4 is a view similar to FIG. 4A showing the window glass in its partially raised position.

DETAILED DESCRIPTION

Figure 3A:
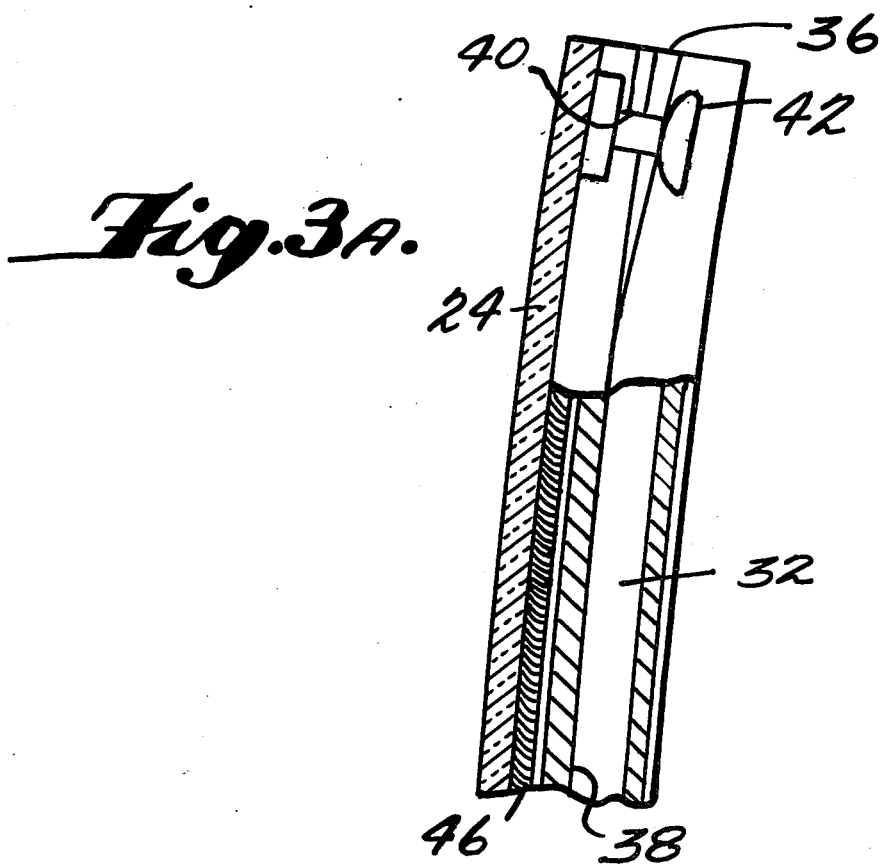
FIG. 3A is a view similar to FIG. 3, showing the window glass in its fully raised position.

FIG. 1 illustrates an automobile door 10, i.e. part of an automobile body 12, having a window opening 14 formed by a frame having a horizontal upper portion 16, two generally upright side portions 18 and 20 and a horizontal belt line portion 22. A window glass 24 is vertically movable within the window opening 14 by means of a raising and lowering mechanism 26. The glass 24, which is illustrated as having a cylindrical curvature, and the mechanism 26 may be conventional.

In FIGS. 3 and 4 the glass 24 is illustrated in a position slightly below its full up position, that is, just before the upper edge of the glass 24 engages a sealing strip 28 carried by and extending along the length of the upper frame portion 16. The illustrated sealing strip 28 is a hollow, tube-type strip of polymeric material which is resiliently collapsible by the edge portion of the glass 24 as the latter moves to its full up position shown in FIG. 4A. Movement of the upper edge of the glass 24 from the FIG. 4 position to the FIG. 4A position is upwardly and inwardly, as described below, and as a result the sealing strip 28 is partially collapsed in two mutually perpendicular directions. Thus both the upwardly facing surface 24a of the edge of the glass 24 and the adjacent inner surface 24b of the glass 24 are in sealing engagement with the sealing strip 28. It will be seen that in the fully closed position the glass 24 is substantially flush with the top frame portion 16.

Figure 5:
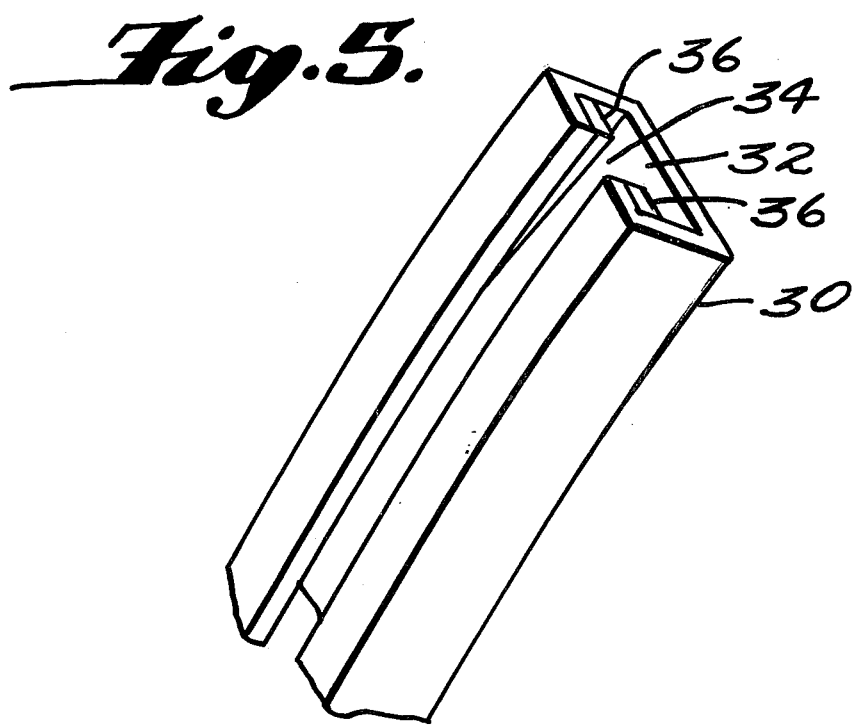
FIG. 5 is a fragmentary perspective view of the guide channel of FIG. 1.

Vertical movement of the glass 24 by the raising and lowering mechanism 26 is guided by the guide means illustrated in FIGS. 2, 3, 3A and 5. As best shown in FIG. 3 the upright side frame portion 18 of the door 10 carries a fixed guide rail 30 disposed inwardly of the glass 24 and having a T-shaped guide track 32. The guide track 32 faces outwardly toward the glass. For most of its length the track 32 is parallel to the cylindrical curvature of the glass 24, but near its upper end the track 32 angles inwardly toward the interior of the vehicle, as shown at 34. As shown in FIG. 5 the angled portion 34 may be formed by securing two wedge-shaped elements 36 to the inner surfaces of the flange portions 38 of the rail 30.

A guide member 40 is attached to the glass 24 close to its upper edge and at a location near the side frame portion 18. The guide member 40 projects inwardly from the glass 24 and includes a slide element 42 which is slidably retained in the guide track 32 so as to be guided by the latter. As seen in FIG. 2 each of the flanges 38 of the guide rail 30 carries a sealing strip 44,46 having a sealing surface which faces outwardly toward the inner surface of the glass 24. As shown, the sealing surfaces are pile surfaces, although other forms of sealing surfaces are also suitable. An analogous sealing structure 48 (FIG. 1) is carried by the other side frame portion 20 for cooperation with the respective side edge of the glass 24. The arrangement of the track 32 and the slide element 42 is such that the inner surfaces of the side edges of the glass 24 are substantially out of contact with their respective sealing strips 44,46 and 48 except for the final movement of the glass 24 into its full up position. During this final movement the cooperation of the slide element 42 with the angled portion 34 of the guide track 32 causes the glass 24 to tilt inwardly into compression with the sealing strips 44,46 and 48. This tilting movement is accommodated by bending of or play in the components of the raising and lowering mechanism 26 and/or the connection between the lower edge portion of the glass 24 and the mechanism, and/or by flexing of the beltline strip to allow movement of the glass. By "beltline strip" is meant the horizontal seal that is on either side against the glass approximately half way up the door and which the glass slides against as it retreats into the door.

FIGS. 2 and 3 illustrate the position of the glass 24 relative to the sealing strips 44 and 46 as the glass 24 is being moved up or down toward or away from its closed position. As there is little or no contact of the glass with the sealing surface of the strips 44 and 46 during this movement, there is little or no frictional resistance to movement of the glass 24 and little or no wear on the sealing strips 44 and 46. The same relationship exists between the glass 24 and the sealing strip 48. FIG. 3A illustrates the position of the glass 24 relative to the sealing surface of the strips 44,46 in the full up position of the glass, the sealing strips 44,46 being compressed by the glass 24. The same compression seal exists between the glass 24 and the sealing strip 48.

What is claimed is:

1. A flush-glass window assembly for an automotive vehicle body comprising: a window frame formed by the vehicle body, said frame including a generally horizontal top portion, two spaced-apart upright side portions and a generally horizontal belt line portion which together define a window opening; sealing means extending the length of and carried by said top portion and each of said side portions, said sealing means having sealing surfaces facing outwardly away from the interior of the vehicle body and having in addition a sealing surface facing downwardly from said top portion; a vertically movable window glass adapted to be raised and lowered in said window opening by a raising and lowering mechanism located within the vehicle body below said belt line portion; and guide means for guiding said glass during vertical movement thereof by the raising and lowering means, such that along essentially its entire path of movement the inner surface of each side edge of the glass is adjacent to and spaced outwardly from the respective outwardly facing sealing surface thereby avoiding frictional resistance to vertical movement and such that as the glass approaches its full raised position the glass moves inwardly toward the interior of the vehicle and toward and into contact with said respective outwardly facing sealing surfaces to form a compression seal therewith, the upper portion of the glass in its full up position within said window opening being substantially flush with the adjacent frame portions and the upwardly facing edge of the top of the glass forming a compression seal with said downwardly facing sealing surface.

2. A window assembly as in claim 1 wherein the side edges of the glass are free of any attached frame members and thereby are directly engageable with the respective sealing surfaces, and wherein said guide means includes an upright guide rail carried by one of said upright side frame portions, the upper end portion of said guide rail being angled inwardly toward the interior of the vehicle, said guide means further including at least one guide member attached to said glass and projecting inwardly toward the interior of the vehicle, said guide member being in engagement with and guided by said rail such that the angled upper portion of said rail forces said guide member and said glass inwardly as said glass approaches its full raised position.

3. A window glass assembly as in claim 1 wherein the side edges and the upper edge of the glass are free of any attached frame members so that the side edge portions and top edge portion of the glass are directly engageable with the respective sealing surfaces of said sealing means, the sealing means providing said downwardly facing sealing surface being compressible and deformable by the upwardly facing edge of the top of the glass in a manner such that the deformed sealing means engages both said upwardly facing glass edge and the adjacent inwardly facing glass surface.

4. A window glass assembly as in claim 2 wherein the top edge portion of the glass is free of any attached frame member, the sealing means which provides said downwardly facing sealing surface being compressible and deformable by the upwardly facing edge of the top of the glass in a manner such that the deformed sealing means engages both said upwardly facing glass edge and the adjacent inwardly facing glass surface.

* * * * *